J. T. BRAYTON, DEC'D.
L. BRAYTON, EXECUTRIX.
GOGGLES.
APPLICATION FILED APR. 25, 1914.
1,146,549.
Patented July 13, 1915.
2 SHEETS—SHEET 1.
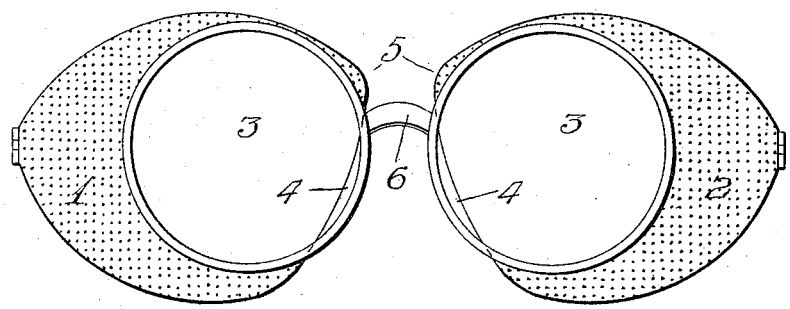
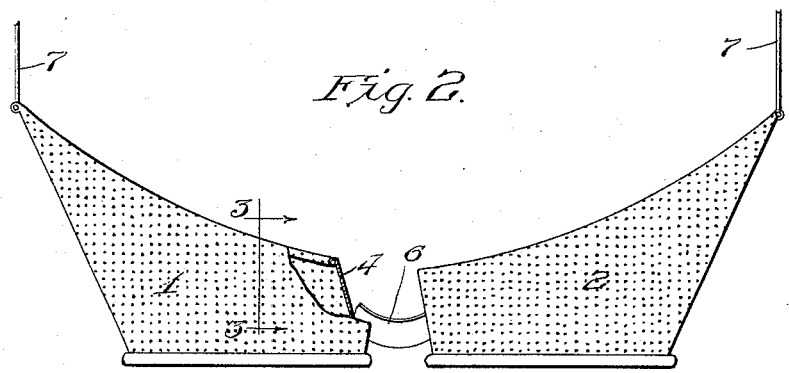
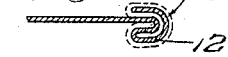
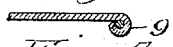
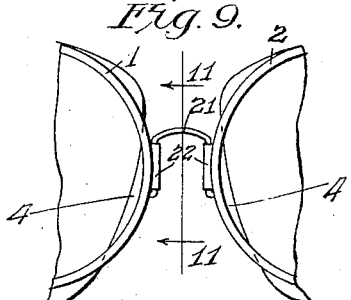
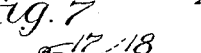
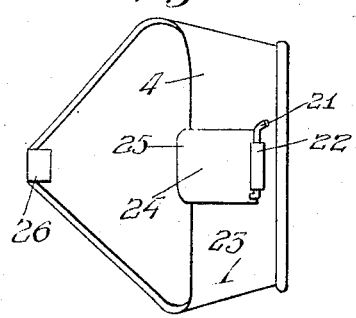
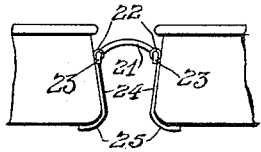
Witnesses:
Inventor:
James T. Brayton
by Chamberlin & Brendenreich
Atty

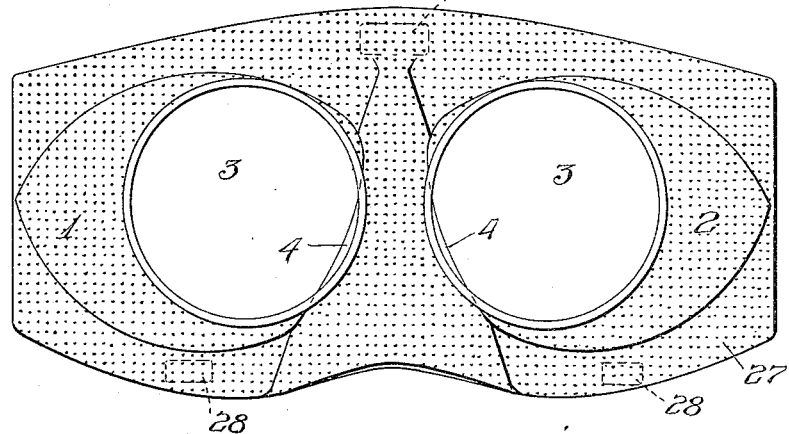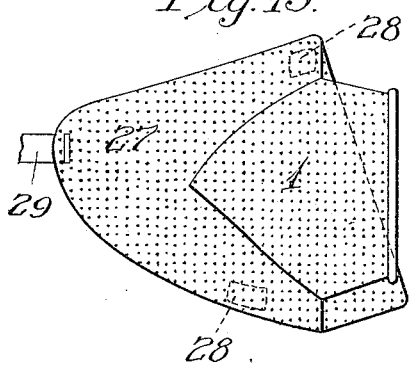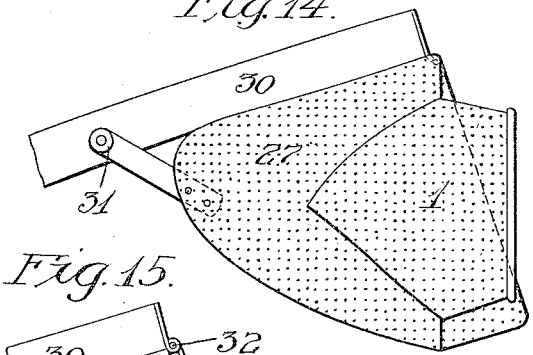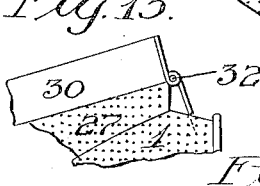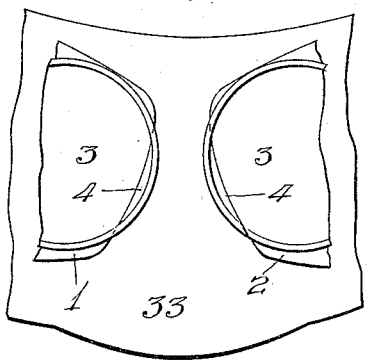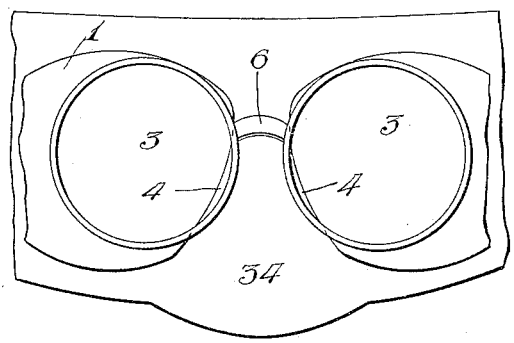

UNITED STATES PATENT OFFICE.

JAMES T. BRAYTON, OF CHICAGO, ILLINOIS; LIBBIE BRAYTON EXECUTRIX OF SAID JAMES T. BRAYTON, DECEASED.

GOGGLES.

1,146,549.  Specification of Letters Patent.  Patented July 13, 1915.

Application filed April 25, 1914. Serial No. 834,381.

*To all whom it may concern:*

Be it known that I, JAMES T. BRAYTON, a citizen of the United States, residing at Chicago, county of Cook, State of Illinois, have invented a certain new and useful Improvement in Goggles, and declare the following to be a full, clear, and exact description of the same, such as will enable others skilled in the art to which it pertains to make and use the same, reference being had to the accompanying drawings, which form a part of this specification.

Workmen in many different fields now quite commonly wear goggles to protect the eyes against heat, light and flying particles, but all of the goggles with which I am familiar are open to objections of various kinds, making them uncomfortable to the wearer, reducing his field of vision, or giving inadequate protection.

The object of my invention is to produce goggles which shall afford a maximum degree of protection, a maximum field of vision and be entirely comfortable to the wearer.

In carrying out my invention I employ a peculiar construction which holds the lenses at any desired distance from the eyes and at the same time keeps the centers of the lenses spaced apart from each other a distance approximately equal to the average pupillary distance between the eyes, thus making it possible to use simple lenses without cutting down the field of vision.

In one of its aspects, therefore, my invention may be regarded as having for its object to produce a goggle construction by means of which a maximum field of vision may be obtained with the use of ordinary simple lenses.

In order to protect the eyes effectively it is necessary that the cups of the goggles fit closely against the face entirely around the eyes.

Another feature of my invention has to do with the construction of the cups and the connection between them which will cause the goggles to set snugly and comfortably upon the wearer regardless of the particular contour of his face or head.

In one of its aspects my invention may therefore be regarded as having for its object to produce goggles which shall be universally adjustable so as to fit comfortably upon the face of any wearer and at the same time afford complete protection to the eyes of the wearer.

It is often desirable to afford protection to the nose and cheek bones as well as to the eyes and in certain of its forms, my invention contemplates the addition to the goggles themselves of means to protect the nose and cheek bones without making the goggles cumbersome or uncomfortable.

The various features of novelty whereby my invention is characterized will hereinafter be pointed out with particularity in the claims; but for a full understanding of my invention and of its objects and advantages reference may be had to the following detailed description taken in connection with the accompanying drawings, wherein:

Figure 1 is a front view of a pair of goggles arranged in accordance with one form of my invention; Fig. 2 is a top plan view of the goggles shown in Fig. 1; Figs. 3 to 8 inclusive are sections taken approximately on line 3—3 of Fig. 2 showing different ways of finishing the edges of the cups which are adapted to touch the face and skin of the wearer; Fig. 9 is a front view of the central portion of a modified form of goggles; Fig. 10 is a top plan view of the device shown in Fig. 9; Fig. 11 is a section taken approximately on line 11—11 of Fig. 9; Fig. 12 is a front view of a pair of goggles constructed and arranged to protect the nose and cheek bones of the wearer; Fig. 13 is a side view of the device shown in Fig. 12; Fig. 14 is a view corresponding to Fig. 13, illustrating a different means for supporting the goggles; Fig. 15 is a fragmentary view corresponding to Figs. 13 and 14 showing a still further means of supporting the goggles; Fig. 16 is a front view of the central portion of a pair of goggles provided with a flexible shield for the nose and cheek bones which also serves as the bridge between the cups of the goggles; and Fig. 17 is a view similar to Fig. 16 showing a device similar to that of Fig. 16 but having a semi-flexible bridge connecting the cups.

Referring first to Figs. 1 and 2 of the drawings, 1 and 2 represent deep eye cups longer at the outer sides than at the inner sides and each shaped to surround one of the eyes of a wearer, fitting into the inner canthus of the eye and extending at its outer side well back on the head. The cups are provided with lenses, 3, of any desired size and shape. The shape of the cups is in the main conical, but if this regular shape is maintained it results in a comparative wide separation of the centers of the lenses and therefore makes it necessary to use special lenses in order to space their centers a distance apart corresponding to the average pupillary distance between the eyes. In accordance with one feature of my invention, I flatten the inner side of each cup and allow it to slope inwardly from the outer portion toward the base, as indicated at 4, thus forming comparatively abrupt corners, 5, each of which will fit nicely into the inner canthus of one of the eyes. The flattened and under cut portions, 4, lie beside the nose and permit the lenses to be carried inwardly across the top of the nose. By properly proportioning the depth of the cups and the extent and degree of the flattening at the inner sides thereof, any desired spacing of the lenses may be obtained and it is entirely feasible to employ ordinary simple lenses and at the same time have their centers spaced so as to correspond with the average pupillary distance between the eyes. Consequently when the goggles are placed in position over the eyes the field of vision of either eye in the direction of the other eye is not cut down as is the case with other goggles with which I am familiar, but it is substantially the same when the goggles are in place as when they are removed and therefore the vision of the wearer, when looking ahead, is not interfered with in any way by the goggles.

The cups themselves may be made of any desired material. In the arrangement shown, they are made of slitted sheet metal which permits the wearer to look sidewise through the cups themselves and thus have a field of vision substantially the same as he has when not wearing the goggles. The cups may be connected together in any suitable way. In the arrangement shown in Figs. 1 and 2, I have illustrated them as joined by a thin flat strip of spring metal, 6, in the nature of a bridge piece. This produces a semi-flexible or a semi-rigid connection which permits the cups to adjust themselves automatically to the face of a wearer without permitting lost motion or looseness which would result in causing the two members of the goggles to get out of alinement or yield in such a way as to distribute the pressure unevenly. In other words, the cups are firmly connected together just as though joined by a rigid bridge, but are allowed a limited relative swinging movement similar to that which would be permitted by a simple hinge connection in order to enable the cups to adjust themselves nicely in contact with the face of the wearer; such movement, however, being against the tension of the spring bridge piece. The goggles may be held in place in any suitable way as, for example, by means of temples, 7, or any other means which will enable the wearer to draw the outer wings of the cups snugly against the side of the head or face. The edge of each cup at the mouth or base thereof may be suitably finished. If the cups are made of non-conducting material the edges may simply be rolled over as indicated at 9 in Fig. 3 and thus form a smooth rounded edge which will not cut into the skin or flesh. This same edging may be employed where the cups are of metal if the goggles are to be used under conditions which do not make it objectionable to have metal in contact with the face.

In Fig. 4 I have illustrated a different form of edge finish, the edge of the cup being bent back upon itself as indicated at 10 and a U-shaped piece, 11, of non-conducting material being placed over the same.

In Fig. 5 the edge of the cup is bent into the shape of an S whose tail is then continued upwardly over the top portion, 12, indicating the bent edge of the cup. Before bending the material of the cup a piece of non-conducting material, 13, is placed beside the same and this non-conducting material is folded in with the material of the cup and forms a non-conducting cover around the periphery of the same.

In Fig. 6 the edge of the cup is folded back as indicated at 10 in the same manner as in Fig. 4. The covering, however, consists of a tube, 14, of rubber or other insulating material within which is inserted a U-shaped strip of metal, 15, the members 14 and 15 forming a U-shaped piece which is pressed about the folded portion, 10, of the cup.

In Fig. 7 I have illustrated substantially the same arrangement as in Fig. 5, the bent edge, 16, corresponding to the part 12 in Fig. 5, there being however, a lip, 17, at the extreme end of the bent portion; and the insulating material, 18, being caught at one edge under the lip, 17, continuing around the exterior of the part 16 into the first bend where it is clamped in place.

In Fig. 8 the edge of the cup is bent into the form of a socket, 19, in which is seated a small inflatable tube, 20, adapted to form a pneumatic cushion between the cup and the skin of the wearer. It is often desirable that goggles be made collapsible, at least to the extent that they may be folded and thus be in a compact form when not in use. One of the features of my invention relates to a simple connecting piece between the cups which will permit them to be folded upon each other and automatically adjust themselves to the face of the wearer without, however, allowing any lost motion or making it possible for the lenses to get out of alinement. This feature of my invention is best illustrated in Figs. 9 to 11. Between the two members of the goggles is a U-shaped wire bridge piece, 21, having its yoke uppermost and its arms vertical. The arms project through tubular bearing pieces, 22, on the inner sides of the cups. The lower ends of the arms are bent laterally toward the bases of the cups as indicated at 23. The parts are so proportioned that when the goggles are open and ready for use, the fingers 23 engage with the sides of the cups and limit the opening movement of the goggles. In other words, the goggles are folded by swinging the lenses toward each other and are opened by swinging the lenses apart and into ultimate positions which are determined by the engagement of the fingers 23 with the sides of the cups. When in use the parts are in the positions indicated in Figs. 9 and 10, giving substantially the same effect as that produced by the semi-flexible or semi-rigid bridge piece in the construction shown in Figs. 1 and 2. In other words, the bridge connection shown in Figs. 9 to 11 permits the cups to adjust themselves automatically. as the bridge piece will yield; but it will yield in substantially the same way as a resilient member fixed at both ends to the cups and will therefore hold the cups firmly in the proper relation to each other.

In Figs. 9 to 11 I have illustrated a further improvement which consists in placing at the bottom of the flattened portions 4, plates, 24, of insulating material or other material extending from the exterior underneath the bottom edges of the cups and forming wide rests or supports, 25. A similar rest or support, 26, may be placed at the base of the outer wing of each cup.

The devices heretofore described are in the nature of simple goggles. Substantially all of the novel features of these goggles may, however, be applied to more elaborate designs which contemplate protecting the nose and cheek bones as well as the eyes of the wearer. Thus in Figs. 12 and 13 I have illustrated a mask, 27, which may be of any kind of stiff self-sustaining material, perforated or not as may be desired. The mask is curved to approximate the contour of an ordinary face in the vicinity of the eyes and carries eye cups, 1 and 2, provided with lenses, 3. If made of metal, the mask may be provided on the rear side with pads or cushions, 28, of cork or other non-conducting material which will hold the mask out of contact with the skin. The mask may be secured in place by means of a strap or band, 29, connected to the sides of the mask and passing around the head. Or, it may be hinged to a band, 30, adapted to extend around the head somewhat like an ordinary hat band. In Fig. 14 the hinges 31 are at the sides so that the entire mask may be swung up and rest on top of the head when not in use. In Fig. 15 the hinge 32 is between the center of the top of the mask and the front of the band 30, and is of the type which will hold the mask in any position into which it is moved or, at least, hold the mask raised when it is swung up out of the way.

In Fig. 16 I have illustrated an arrangement in which the mask 33 is of flexible material, is shaped to cover the nose and cheek bones and is provided with cups, 1 and 2. This mask is foldable and the material thereof serves as a flexible bridge between the cups.

In Fig. 17 I have illustrated an arrangement which is a combination of the flexible mask of Fig. 16 and the complete goggles of Fig. 1. In other words, it consists of the goggles of Fig. 1 having the bases of the cups secured to a flexible mask, 34, large enough to cover the nose and cheek bones of the wearer.

It will thus be seen that I have produced a series of goggles, either simple in character or in the nature of masks, which make it possible to obtain any desired degree of protection against heat, light or flying particles, not only for the eyes but also for the cheek bones and nose, give a maximum field of vision, produce no discomfort to the wearer, and are automatically adjustable to the face of the wearer.

While I have illustrated only a few forms of my invention, I do not desire to be limited to the exact details so illustrated; but intend to cover all forms and arrangements which come within the definitions of my invention constituting the appended claims.

I claim:

1. A device comprising two cups each each adapted to surround one of the eyes of a wearer and fit into its inner canthus, lenses in said cups, and means connecting the cups together, each cup having a portion at the inner side deflected inwardly as the base is approached so as to bring portions of the lenses nearer together than the underlying base portions of the cups.

2. A device comprising two cups each adapted to surround one of the eyes of a wearer and fit into its inner canthus, lenses in said cups, and a resilient bridge piece hinged to said cups and permitting them to be folded together in the outward direction, said bridge piece having parts adapted to engage with the cups and limit the relative swinging movements of the cups in the inward direction.

3. A device comprising two cups each adapted to surround one of the eyes of a wearer, lenses in said cups, a shield for the nose and cheek bones of the wearer connected to the bases of the cups, each cup having a portion at the inner side deflected inwardly as the base is approached so as to bring the lenses nearer together than the base portions of the cups.

4. A device comprising two cups each shaped at its base to surround one of the eyes of a wearer, fit into the inner canthus of the eye, and engage with the face below the eye; lenses in said cups, each cup having a portion at its inner side deflected inwardly as the base is approached so as to permit the cups to lie close beside the nose and at the same time reduce the distance between the centers of the lenses to a minimum.

5. A device comprising two cups each shaped to surround one of the eyes of a wearer, fit into the inner canthus of the eye, and extend down beside the nose; each cup being largest at the base and decreasing in size toward the front; lenses in the front end of the cups, and means connecting the cups together.

6. A device comprising two cups each shaped at its base to surround one of the eyes of a wearer, fit into the inner canthus of the eye, and engage with the face below the eye; the cups being in the form of truncated cones largest at the bases thereof; lenses in the smaller ends of the cups; each cup having a portion at its inner side deflected inwardly as the base is approached so as to permit the cups to lie close beside the nose and at the same time reduce the distance between the centers of the lenses to a minimum.

7. A device comprising two cups in the approximate shape of frustums of cones each shaped at its base to surround one of the eyes of a wearer, and fit into the inner canthus of the eye, lenses in the smaller ends of the cups, each cup having a portion at its inner side deflected inwardly as the base is approached so as to permit the cups to lie close beside the nose and at the same time reduce the distance between the centers of the lenses to a minimum.

8. A device comprising two cups each shaped to surround one of the eyes of a wearer, fit into the inner canthus of the eye, and extend down beside the nose; lenses in said cups, and a bridge piece connecting said cups together, said bridge piece comprising a thin strip of spring metal of considerable width fixed at its ends to the cups and having its rear edge slightly higher than the front edge.

9. A device comprising two cups each shaped to surround one of the eyes of a wearer, fit into the inner canthus of the eye, and extend down beside the nose; lenses in said cups, and a bridge piece connecting said cups together, said bridge piece comprising a thin strip of spring metal of considerable width fixed at its ends to the cups in a position tending to hold the lenses normally in approximately the same plane and permit the cups to yield in a direction required to make the bases of the cups fit faces of various widths.

In testimony whereof, I sign this specification in the presence of two witnesses.

JAMES T. BRAYTON.

Witnesses:
WM. F. FREUDENREICH,
RUTH E. ZETTERVALL.

Copies of this patent may be obtained for five cents each, by addressing the "Commissioner of Patents, Washington, D. C."